(12) United States Patent
Paune Fabre (10) Patent No.: US 11,454,825 B2
(45) Date of Patent: Sep. 27, 2022

(54) ORTHOKERATOLOGY CONTACT LENS FOR TREATING MYOPIA

(71) Applicants: LABORATOIRE PRECILENS, Creteil (FR); Jaume Paune Fabre, Barcelona (ES)

(72) Inventor: Jaume Paune Fabre, Barcelona (ES)

(73) Assignees: Laboratoire Precilens, Creteil (FR); Jaume Paune Fabre, Barcelona (ES)

(*) Notice: Subject to any disclaimer, the term of this patent is extended or adjusted under 35 U.S.C. 154(b) by 359 days.

(21) Appl. No.: 16/725,495

(22) Filed: Dec. 23, 2019

(65) Prior Publication Data

US 2020/0133024 A1    Apr. 30, 2020

Related U.S. Application Data

(63) Continuation of application No. PCT/FR2018/051431, filed on Jun. 15, 2018.

(30) Foreign Application Priority Data

Jun. 22, 2017    (FR) ...................... 1755684

(51) Int. Cl.
G02C 7/04    (2006.01)

(52) U.S. Cl.
CPC ......... *G02C 7/047* (2013.01); *G02C 2202/24* (2013.01)

(58) Field of Classification Search
CPC .............................. G02C 7/047; G02C 2202/24
USPC .................... 351/41, 159.01, 159.02, 159.23
See application file for complete search history.

(56) References Cited

U.S. PATENT DOCUMENTS

| 5,695,509 | A   | 12/1997 | El Hage |
| 7,025,460 | B2  | 4/2006  | Smitth |
| 7,070,275 | B2* | 7/2006  | Tung ............... G02C 7/047 351/159.41 |
| 10,564,447 | B2* | 2/2020 | Mitsui ............. G02C 7/047 |

(Continued)

FOREIGN PATENT DOCUMENTS

| EP | 3073316 | 9/2016 |
| JP | 2006043150 | 2/2006 |

(Continued)

OTHER PUBLICATIONS

International Search Report for International Application PCT/FR2018/051431, dated Sep. 4, 2018.

(Continued)

*Primary Examiner* — Tuyen Tra
(74) *Attorney, Agent, or Firm* — Burris Law, PLLC (57) ABSTRACT

An orthokeratology contact lens for controlling myopia includes a curved front side and a back side intended to be applied to the eye. the back side defines a central area designed to align with the optical area of the eye, and a peripheral area, concentric to the central area, which includes an annular portion defining a tear accumulation area. The annular portion includes a first segment, which extends concentrically in relation to the central area, up to an annular limit line, and a second segment which extends from the annular limit line concentrically in relation to the central area, configured to extend up to the cornea. The first segment and the second segment form a broken line such that the annular limit line defines a peak with the height of a tear.

15 Claims, 8 Drawing Sheets

(56) References Cited

U.S. PATENT DOCUMENTS

2002/0186344 A1   12/2002  Tung
2006/0132707 A1    6/2006  Tung
2015/0124212 A1    5/2015  Loertscher

FOREIGN PATENT DOCUMENTS

JP      2008112121      5/2008
TW         I588562      6/2017
WO      2009/149116    12/2009

OTHER PUBLICATIONS

Queirós, et al., Peripheral refraction in myopic patients after orthokeratology, Optometry and Vision Science, 2010, pp. 323-329, vol. 87(5).
Smith III, E. L., Optical treatment strategies to slow myopia progression: Effects of the visual extent of the optical treatment zone, Abstract, Experimental Eye Research, Sep. 2013, pp. 77-88, vol. 114.
Benavente-Pérez, et al., Axial Eye Growth and Refractive Error Development Can Be Modified by Exposing the Peripheral Retina to Relative Myopic or Hyperopic Defocus, Investigative Ophthalmology & Visual Science, 2014, pp. 6765-6773, vol. 55(10), The Association for Research in Vision and Ophthalmology, Inc.
Faria-Ribeiro et al., Peripheral Refraction and Retinal Contour in Stable and Progressive Myopia, Optometry and Vision Science, Jan. 2013, pp. 9-15, vol. 90(1), American Academy of Optometry.
Zhong et al., Corneal power change is predictive of myopia progression in orthokeratology, Abstract, Optometry and Vision Science, Apr. 2014, pp. 404-411, vol. 91(4).

* cited by examiner

ORTHOKERATOLOGY CONTACT LENS FOR TREATING MYOPIA

CROSS-REFERENCE TO RELATED APPLICATIONS

This application is a continuation of International Application No. PCT/FR2018/051431, filed on Jun. 15, 2018, which claims priority to and the benefit of FR 17/55684 filed on Jun. 22, 2017. The disclosures of the above applications are incorporated herein by reference.

FIELD

The present disclosure relates to an orthokeratology contact lens for treating myopia, which allows reducing or inhibiting the progression of the myopia in a patient.

BACKGROUND

The statements in this section merely provide background information related to the present disclosure and may not constitute prior art.

The posterior surface of a contact lens is the surface configured to be in contact with the cornea of the eye, in the use position, in opposition with the anterior surface which is intended to be in contact with the outside. It will be also called posterior side.

In the following text, the cornea will be indifferently called corneal epithelium or cornea.

The positive corneal power expresses the refraction power of the first optical surface of the eye and is equivalent to the reciprocal or inverse value of its focal distance expressed in meters. The cornea is the first refractive element of the eye, with a positive-sign power which corresponds to convergent surfaces. A corneal power amp-up at a determined point or area will imply a positive power amp-up. This has the effect of advancing the focal plane and therefore imparts a focusing of the image in a plane closer to the cornea.

The "cornea" surface is a surface that may be represented according to four distinct and juxtaposed annular areas:

a central area, called optical area, with a diameter in the range of 3 mm, a first para-central or mid-peripheral ring, with a width in the range of 2 mm, a second ring, also called peripheral annular area, with a width in the range of 2 mm, and a third ring, called limbal ring, whose width depends on the position of the scleral area.

The scleral area is the transition area between the cornea and the sclera.

There are known orthokeratology contact lenses, also called reverse-geometry lenses, intended to modify the surface of the cornea and to correct the ocular refraction errors during sleep. These are lenses with a structure which allows distributing the hydrodynamic pressure through the corneal epithelium during sleep in a controlled manner, thus bringing the shape of the cornea to fit to the shape of the lens. Hence, these lenses have a shape adapted to distribute the hydrodynamic pressure through the corneal epithelium during sleep, in a controlled manner. These lenses modify the anterior corneal geometry and curvature, producing a change in the refraction in the area where lies the optical axis that corrects the distance vision. Simultaneously, they produce an amp-up of the refractive power in the mid-peripheral corneal area which modifies the focusing of the peripheral or lateral images projected on the peripheral or lateral retina (Queiros, A.; Gonzalez-Meijome, J. M.; Jorge, J.; Villa-Collar, C.; Gutierrez, A. R.; *Peripheral refraction in myopic patients after orthokeratology*. Optometry and Vision Science (2010), 87(5), 323-329. http://doi.org/10.1097/oPx.Ob013e3181d951f7).

Studies on the myopic eye have shown that, with regards to the refraction measured on the central optical axis, said eye has less refractive power for peripheral visual images that are focused on the peripheral retina, producing a peripheral defocusing or a blur of the image behind the retina (also called hypermetropic eye) when the refraction in the optical axis is compensated by contact lenses or common spherical glasses and the patient focuses on the object of interest with the central retina. This blurred image in the peripheral retina has been described in studies conducted on animals as the optical cause of the progression of the myopia, since it has been proved, through studies conducted on animals, that the peripheral refraction interferes with and governs the ocular growth model of myopic eyes (Smith, E. L. *Optical treatment strategies to slow myopia progression: effects of the visual extent of the optical treatment zone*. Experimental Eye Research 2010, 114, 77-88. http://doi.org/I0.I016/i.exer.2012.11.019).

Consequently, lenses that reduce or slow the progression of the myopia should have a more positive optical power on their periphery than that of the optical axis, which enables them, according to the aforementioned studies, to locate the peripheral image in front of the retina in most myopic persons, although ideally, they should be customized, by adapting them to the person undergoing the treatment. It has also been described that, the larger the area that remains focused in front of the lateral retina, the more significant will be the effectiveness (Benavente-Perez, A.; Nour, A; Troilo, D. *Axial Eye Growth and Refractive Error Development Can Be Modified by Exposing the Peripheral Retina to Relative Myopic or Hyperopic Defocus*. Investigative Ophthalmology & Visual Science, 55(10), 6765-73. http://doi.org/10.1167/iovs.14-14524).

Some optical treatments, such as orthokeratology, which reverse the peripheral refraction profile in myopic eyes, have been identified as possible means to control the excessive increase of the axial length of the myopic eye (Faria-Ribeiro, M.; Queiros, A.; Lopes-Ferreira, D.; Jorge, J.; & Gonzalez-Meijome, J. M. *Peripheral refraction and retinal contour in stable and progressive myopia*. Optometry and Vision Science 2013, 90(1), 9-15. http://doi.org/10.1097/0PX.ObOI3e318278153c).

It is known that, in the case of orthokeratology, the amount of change of the central and mid-peripheral cornea is directly related to the amount of myopia to be corrected (Queiros, A.; Gonzalez-Meijome, J. M.; Jorge, J.; Villa-Collar, C.; Gutierrez, A. R. *Peripheral refraction in myopic patients after orthokeratology*. Optometry and Vision Science (2010), 87(5), 323-329. http://doi.org/I0.1097/0PX.ObOI3e3181d951f7), consequently in the case of a slight and/or low myopia, the effectiveness of the control of the myopia decreases when the optimal amount of amp-up of the curvature in the mid-peripheral cornea is not obtained (Zhong, Y.; Chen, Z.; Xue, F.; Zhou, J.; Niu, L. Corneal Power Change Is Predictive of Myopia Progression in Orthokeratology. Optometry & Vision Science. (2014), 91(4), 404-411. http://doi.org/10.1097/0PX.0000000000000183).

The aforementioned scientific contributions have given rise to optical devices that are the object of various patents.

U.S. Pat. No. 7,025,460 focuses on the control of the refraction outside the optical axis, by manipulating the field curvature of an image, to displace the peripheral image in front of the peripheral retina. Its proposition comprises a non-modified central vision area and a peripheral treatment area, because of which it has the drawback of leaving the non-modified central vision area and not placing the retinal image at the front.

Consequently, although the aforementioned patent could correct the myopia differently in the fovea, that is to say the central vision region, and in peripheral areas of the retina, in order to provide a good vision in the optical axis while forming images originating from the visual periphery on or in front of the retina, this patent covers lenses for daily wear having two clearly delimited vision areas. These lenses give rise to a bifocality or to a double image, which does not provide a constant focusing in front of and all over the retina, and which continues enabling the activation of the mechanisms that generate the ocular elongation.

U.S. Patent Publication No. 2015/0124212 discloses a design of an orthokeratology lens having a smaller central area than the conventional lenses and with more incurved adjacent curve than the preceding lens, in order to generate an addition area (refractive power amp-up) in the pupillary area. The drawback of this lens type is that it does not allow controlling or determining the amount of change induced in the mid-peripheral corneal power and, consequently, will not be effective in low myopias. In addition, the myopic defocusing area, which as a more positive power, is located inside the pupillary area, which has the drawback of generating halos and a visual discomfort.

Such lenses control neither the amount of addition of corneal power to be applied nor the location with regards to each patient. In particular, this leaves low or developing myopias lower than four diopters without a good progression control effect.

Furthermore, it is known that, in order to obtain a proper result with an orthokeratology treatment, in particular in the case of nocturnal orthokeratology, it is essential that the lens be perfectly centered during the night.

The known orthokeratology contact lenses have so-called alignment curves located in the most peripheral areas of the lens, whose function is to center the lens. Unfortunately, these resultant curves, which have the same radius as the peripheral corneal area where they lie, are not fully effective in this respect, since they do not enable the use of hydrodynamic forces and therefore do not effectively contribute to the pursued objective.

SUMMARY

This section provides a general summary of the disclosure and is not a comprehensive disclosure of its full scope or all of its features.

The present disclosure provides an orthokeratology contact lens intended to be used over the cornea of an eye to treat myopia, which has the advantages described hereinbelow.

According to a first aspect, the present disclosure relates to an orthokeratology contact lens, said lens being a reverse-geometry rigid lens, which comprises an incurved anterior side and a posterior side, wherein said posterior side defines:

a central area adapted to coincide with the optical area of the eye, and to conform the surface of the cornea by exerting a positive hydrodynamic pressure on the corneal epithelium; and a peripheral area, concentric with said central area, which comprises an annular portion defining a teardrops accumulation area configured to exert a negative hydrodynamic pressure on the surface of the cornea by conforming the surface of the cornea and by creating a positive power amp-up ring;

characterized in that the annular portion includes:

a first segment which extends concentrically with respect to the central area, radially with respect to the geometric center which defines the curvature of the posterior side, towards the incurved anterior side up to an annular border line; and a second segment which extends from said annular border line, concentrically with respect to the central area, the second segment being configured to extend up to a point of contact with the surface of the cornea, where the first segment and the second segment form a broken line, such that the annular border line defines a ridge for the teardrops accumulation area having a teardrops height.

Hence, the ridge is an intersection of two line segments.

The first and second segments form the ridge whose apex is a singular point.

The teardrops height corresponds to the length of the segment of the annular broken line comprised between the apex of the ridge and the cornea, when the lens is in the use position.

In this manner, the position and the amount of corneal power to be applied may be controlled, which translates in the exact modification of the focusing of the image on the peripheral retina, by maintaining the optical correction desired to each user or patient. With said lens, images originating from some visual fields of the eye are projected on the peripheral retina, in front of the retina of said eye.

The optical area of the eye may be called visual area or vision area of the eye.

Furthermore, a broken line is also called polygonal or polyline line.

Moreover, the surface of the cornea may also be called corneal epithelium.

In one form, the value of the teardrops height is within a range from 30 to 150 microns. Consequently, the teardrops accumulation area may acquire different heights according to the amount of corneal power to be applied, such that it allows deforming the surface of the cornea of the eye, by increasing the negative hydrodynamic pressure inside the teardrops accumulation, thus creating the positive power amp-up ring.

Advantageously, the broken line is formed by the first segment, the second segment and the central area.

Thus, the teardrops height may be modified and controlled without modifying the curvature of the central area.

The peripheral area, and more specifically the annular portion, is modified independently of the central area.

According to this configuration, the central area and the first segment have an intersection formed by a singular point.

Thus, the teardrops height may be modified and controlled in an accurate manner.

In one form, the annular border line is located at a radial distance comprised between 1.5 mm and 3.5 mm with respect to the geometric center of the central area.

In this manner, said annular border line will be located at a radial distance with respect to the optical axis of the eye, equal to a visual axis of the eye comprised between 10° and 30°.

In another form, the annular portion is configured to induce a positive power amp-up in a region comprised between 10° and 30°, creating a positive refraction which places the peripheral image in said region in front of the retina of said eye.

Thus, the annular portion enables the images originating from the visual axes located between 10° and 30° with respect to the optical axis to be projected on a region further at the front of the retina, independently of the central area of the retina.

The central area is formed by a curved line.

In one form, said central area is essentially flat.

In another form, said central area is essentially incurved with regards to the central refraction to be corrected. In this manner, the central area fits to the curvature of the cornea. In addition, the thickness of the lens is essentially reduced, such that the lens is easy to use and comfortable for the user.

Nevertheless, according to an alternative form, the peripheral area also comprises a supplemental annular portion defining a supplemental teardrops accumulation area configured to exert a negative hydrodynamic pressure on the surface of the cornea by conforming the surface of the cornea and by creating a supplemental positive power amp-up ring, which includes:

a first segment which extends concentrically with respect to the central area, radially with respect to the geometric center which defines the curvature of the posterior side, towards the incurved anterior side up to a supplemental annular border line; and a second segment which extends from said annular border line, concentrically with respect to the central area, the second segment being configured to extend up to a point of contact with the surface of the cornea;

where the first segment and the second segment form a broken line, such that the annular border line of the supplemental annular portion defines a ridge for the supplemental teardrops accumulation area having a teardrops height.

In this manner, a supplemental annular portion is generated in a supplemental teardrops accumulation area. Said supplemental teardrops accumulation area generates a negative pressure on the corneal epithelium during the amp-up of the hydrodynamic forces exerted on said area, such that it improves the bearing of the lens on the cornea, by reducing the movement and the displacement of the lens thereon, and by promoting the correct centering of the lens during the use thereof.

In addition, this supplemental annular portion also influences the conformation of the peripheral area of the cornea during the creation of the supplemental power amp-up ring which contributes to bringing at the front the images in the peripheral retina, in particular in the eyes having a pupil diameter larger than the standard diameter or in low light conditions, such that said lens increases and improves the treatment of the myopia.

In the same manner as before, the ridge of the supplemental annular portion is an intersection of two line segments.

The first and second segments of the supplemental annular portion form the ridge for the supplemental teardrops accumulation area, whose apex is a singular point.

The teardrops height of the supplemental annular portion corresponds to the length of the segment of the annular border line of said supplemental annular portion comprised between the apex of the ridge and the cornea, when the lens is in the use position.

In one form, the supplemental teardrops accumulation area has a teardrops height smaller than the teardrops height of the previously-described teardrops accumulation area.

The teardrops height (h2) of the supplemental teardrops accumulation area is advantageously comprised between 10 and 30 microns.

In this manner, a supplemental power amp-up ring is created inside the supplemental teardrops accumulation area which does not interfere with images originating from visual axes comprised between 10° and 30° with respect to the optical axis.

In one form, the annular border line of the supplemental annular portion is located at a radial distance comprised between 2.5 mm and 5 mm with respect to the geometric center of the central area.

In another form, in the peripheral area, the lens comprises a segment adjacent to the supplemental annular portion which extends towards the incurved anterior side up to an annular edge for connection with the latter, forming the edge lacrimal meniscus which enables the teardrops exchange beneath the lens when winking.

In this manner, the teardrops can circulate beneath the lens, lubricating, cleaning and hydrating the eye and accumulating into the teardrops accumulations such as to form the aforementioned annular portions.

Alternatively, the contact lens comprises one or several additional annular portion(s) disposed between the annular portion and the supplemental annular portion.

In this manner, the lens may create one or several annular portion(s) by means of the teardrops accumulations to correct defects of the vision that might be caused by images originating from visual axes different from those comprised between 10° and 30° with respect to the optical axis.

According to an alternative form, the central area comprises an inner circular portion and an outer annular portion, both disposed concentrically with one another and separated by an inner annular border line, where said inner circular portion is defined by a curve having a radius of curvature smaller than the incurved anterior side of the lens, with said inner annular border line configured to be in contact with the surface of the cornea, such that the inner circular portion defines an inner teardrops accumulation area which exerts a negative hydrodynamic pressure on the corneal epithelium, conforming the surface of the cornea and creating a power amp-up hemisphere which defines a ridge for said inner teardrops accumulation area having a teardrops height.

In this manner, a power amp-up hemisphere is formed in the inner circular portion because of the negative hydrodynamic pressure exerted on the surface of the cornea such as to enable the refraction of the images originating from the optical area that coincides with the optical axis in a portion further at the front of the retina.

Advantageously, the value of the teardrops height of the inner teardrops accumulation area is within a range from 5 to 50 microns, such that the teardrops height could be adapted to different myopia values depending on the user.

The claimed lens will be intended to be used over the surface of the cornea of an eye of a human being for a nocturnal period or for a period of prolonged rest of the eye, such that the lens deforms the surface of the cornea, creating positive power amp-up rings or hemispheres which, when removing the lens and during a daytime period, said rings or said hemispheres will enable the refraction of the images originating from said visual axes in a forward area of the retina, controlling the myopia of the eye and the increase of the axial length of the eye.

In the present disclosure, by nocturnal period, it should be understood a sleep and/or prolonged rest period of the eyes comprised between six and eight hours. Similarly, by daytime period, it should be understood a period during which the eye is operating such that it receives a visual stimulus.

Similarly, in the present disclosure, by user or patient, it should be understood a human being having a myopic visual defect is likely to use the contact lens of the present disclosure over the surface of his or her cornea.

In the present disclosure, by optical axis, it should be understood an imaginary straight line which crosses the center of the pupil, the center of the crystalline lens and the center of the eye. By visual axis, it should be understood an imaginary straight line according to an angle defined with respect to the optical axis.

Similarly, in the present disclosure, by cornea, it should be understood the transparent front portion of the eye which covers the iris, the pupil and the anterior chamber, where said cornea is formed by different strata or layers and the corneal epithelium is the stratum disposed such as to be the farthest from the center of the eyeball.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIGS. 1 to 12, the present disclosure proposes an orthokeratology contact lens 100 for treating myopia.

Figure 2:
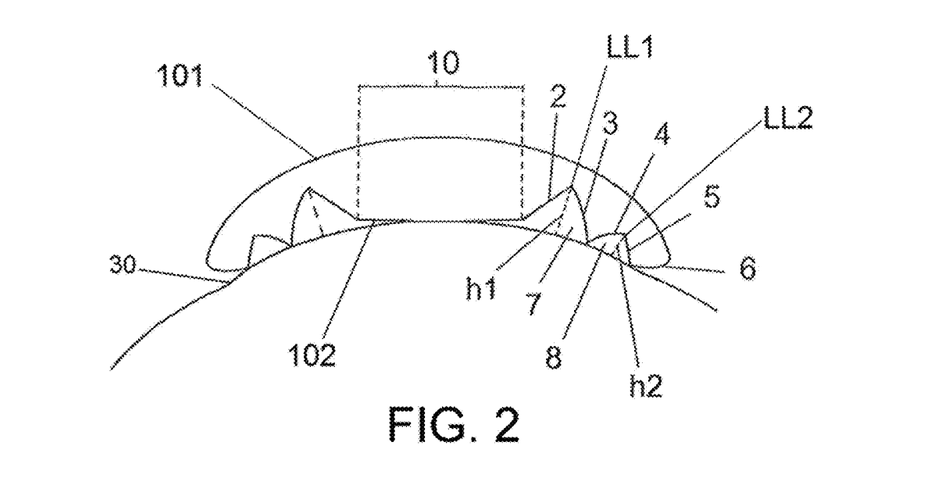
FIG. 2 is a cross-sectional view of the orthokeratology contact lens according to one form of the present disclosure.
Figure 3:
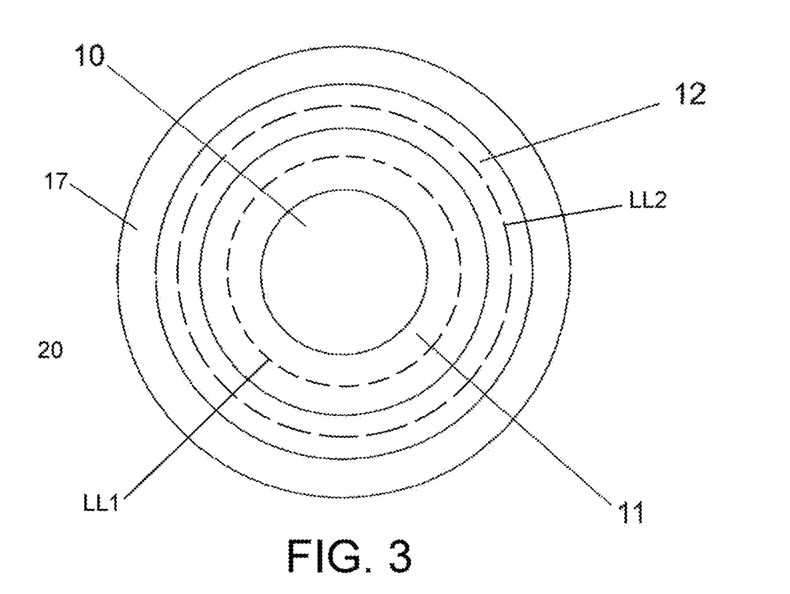
FIG. 3 is a top view of the orthokeratology contact lens of FIG. 1.

What follows is a description of one form represented in FIGS. 2 to 8 of the present disclosure relating to the aforementioned contact lens 100 and which comprises an incurved anterior side 101 and a posterior side 102 which is configured to be applied on an eye, where said posterior side 102 defines:

a central area 10 configured to coincide with the optical or visual area of the eye, where said central area 10 is configured to induce a conformation of the surface of the cornea 30 by exerting a positive hydrodynamic pressure on the corneal epithelium; and a peripheral area 20, concentric with said central area 10, which comprises an annular portion 11 which includes:

a first segment 2 which extends concentrically with respect to the central area 10 up to an annular border line LL1; and a second segment 3 which extends from said annular border line LL1, during use, in the direction of the surface of the cornea 30 up to an end of contact with the latter, where annular portion 11 defines a teardrops accumulation area 7 which is configured to exert a negative hydrodynamic pressure on the corneal epithelium, by conforming the surface of the cornea 30 and creating a positive power amp-up ring 13, said first segment 2 also extending towards said incurved anterior side 101, radially with respect to the geometric center which defines the curvature of the posterior side 102, such that said annular border line LL1 defines a ridge for said teardrops accumulation area 7 having a teardrops height h1.

The central area 10 is formed by a curved line adapted to coincide with the optical area of the eye.

The first segment 2 extends radially with respect to the geometric center which defines the curvature of the posterior side 102, towards the incurved anterior side 101.

The second segment 3 extends concentrically with respect to the central area 10. It is configured to extend up to a point of contact with the cornea 30.

Furthermore, the peripheral area 20 also comprises a supplemental annular portion 12 defining a supplemental teardrops accumulation area 8 configured to exert a negative hydrodynamic pressure on the corneal epithelium by conforming the surface of the cornea and by creating a supplemental positive power amp-up ring 14.

The supplemental annular portion 12 includes:

a first segment 4 which extends concentrically with respect to the central area 10, radially with respect to the geometric center which defines the curvature of the posterior side 102, towards the incurved anterior side 101 up to an annular border line LL2; and a second segment 5 which extends from said annular border line LL2, concentrically with respect to the central area 10, the second segment 5 being configured to extend up to a point of contact with the cornea 30, where the first segment 4 and the second segment 5 form a broken line, such that the annular border line LL2 of the supplemental annular portion 12 defines a ridge for the supplemental teardrops accumulation area 8 having a teardrops height h2.

The curved line forming the central area 10, the first segment 2 and the second segment 3 of the annular portion 11, and the first segment 2 and the second segment 3 of the supplemental annular portion 12, form a broken line.

The contact lens 100 comprises two sides: an incurved anterior side 101 and a posterior side 102. Said posterior side 102 is intended to be positioned on the surface of the cornea 30 of the eye, coming into contact with the latter, such that the central area 10 of the contact lens 100 coincides with the optical or visual area of the eye (see FIG. 2).

Similarly, it may be observed that between the surface of the cornea 30 and the contact lens 100, teardrops accumulation areas or cavities 7, 8 are created with their respective teardrops heights h1 and h2. Said accumulation areas 7, 8 may vary their teardrops heights h1, h2 according to the degree of myopia of the patient or of the user (see FIG. 2).

The teardrops accumulation area 7 is disposed inside the annular portion 11, such that a first segment 2 extends concentrically with respect to the central area 10 up to an annular border line LL1 and a second segment 3 extends from the annular border line LL1 in the direction of the surface of the cornea 30, in particular the corneal epithelium, up to an end of contact with the latter (see FIG. 2).

The teardrops accumulation area 8 of the supplemental annular portion 12 is defined inside said supplemental annular portion 12, such that the first segment 4 extends concentrically with respect to the central area 10 towards an annular border line LL2 and the second segment 5 extends from the annular border line LL2 in the direction of the surface of the cornea 30 when the lens is in the use position, in particular the corneal epithelium, up to an end of contact with the latter (see FIG. 2).

As shown in FIG. 2, a segment 6 adjacent to the supplemental annular portion 12 extends towards the incurved anterior side 101 up to an annular edge for connection with the latter, forming the edge lacrimal meniscus 17, which enables a teardrops exchange beneath the contact lens 100 when winking, such that it lubricates, cleans, hydrates the eye and accumulates in the teardrops accumulation areas 7, 8 to form the aforementioned annular portions 11, 12 (see FIG. 2).

The contact lens 100 is split into different areas concentric with one another. In the described form, the central area 10 occupies the central position followed by a peripheral area 20 which extends radially towards outwards from the contact lens 100 and which comprises an annular portion 11, the supplemental annular portion 12 and the edge lacrimal meniscus 17 (see FIG. 3).

As described hereinabove, the contact lens 100 will deform the surface of the cornea 30, creating a first power amp-up ring 13, also called power amp-up ring 13, inside the teardrops accumulation area 7 and a second power amp-up ring 14, also called supplemental power amp-up ring, inside the supplemental teardrops accumulation area 8. The refractive power which will be generated by said power amp-up rings 13, 14 will be determined by the teardrops height h1, h2. The larger the teardrops height h1, h2, the higher will be the hydrodynamic pressure exerted on the surface of the cornea 30 and, consequently, the larger will be the power amp-up rings 13, 14. Similarly, the size of the power amp-up rings 13, 14 will influence the refractive power created thereby: the larger the power amp-up rings 13, 14, the higher will be the refractive power (see FIG. 4).

Figure 5:
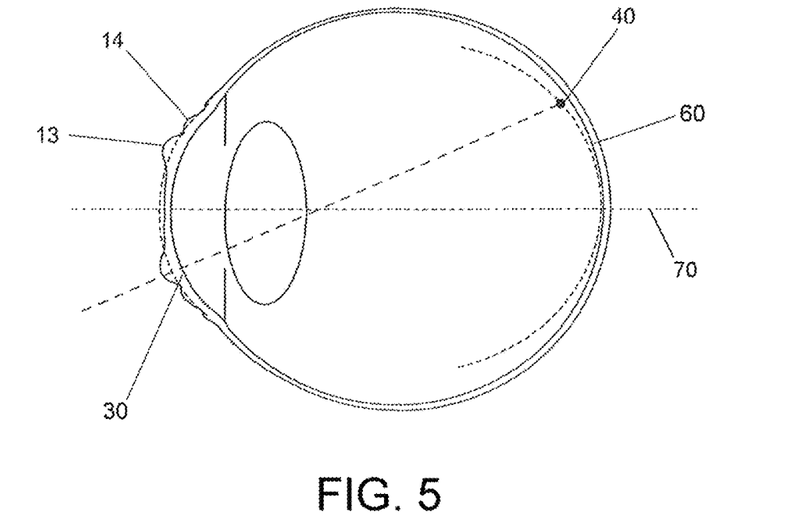
FIG. 5 is a cross-sectional view of a human eye treated with the lens of FIG. 2, illustrating the conformation of the surface of the cornea caused by the lens and the point where the peripheral image is projected.

Once the contact lens 100 is deposited over the surface of the cornea 30 and left to act for a nocturnal period, the surface of the cornea 30 of the eye of the user or of the patient will become deformed as a consequence of the hydrodynamic pressure exerted on the corneal epithelium, creating first and second power amp-up rings 13, 14 on the surface of the cornea 30 (see FIG. 5).

In order to obtain a proper myopia control effect, the central area 10 and the annular portion 11 of the contact lens 100 of the present disclosure are, in one form, located within the 30° of the vision field of the eye. Said position enables, during the conformation of the corneal epithelium in a controlled and accurate manner, the projection of the peripheral image in front of the retina 60 in a peripheral area comprised between 10° and 30° from the optical axis 70, thus promoting the reduction or the inhibition of the progression of the myopia (see FIG. 5).

By controlling the teardrops height h1 of the teardrops accumulation area 7, a controlled change is obtained in the surface of the cornea 30, as shown in FIG. 5, which allows, independently of the diopters of the patient or of a value calculated to correct the refraction defect of the patient in the optical axis 70, an advance of the images created in the peripheral retina, represented by the point 40 in FIG. 5, in front of the retina 60 of the eye, which promotes the reduction of the progression of the myopia of a patient.

In order to obtain the pursued effect, the first power amp-up ring 13, formed on the surface of the cornea 30, thanks to the configuration of the annular portion 11 of the lens, should produce an amp-up of the corneal power comprised between 4 and 8 diopters. To this end, as shown in FIG. 4, the teardrops accumulation area 7 should have a teardrops height h1 which, with respect to the annular border line LL1, has values within a range from 60 microns to 150 microns.

The height h1 values that are larger than those indicates have the drawback of modifying the central refraction and resulting in visual mismatches for the patient, and height h1 values that are smaller than those indicated have the drawback of not properly shaping the cornea 30 and, therefore, the peripheral image would not be projected in front of the retina 60 and, consequently, one of the pursued effects, such as the reduction of the progression of the myopia, is not obtained.

In addition, the teardrops accumulation area 7 and, consequently, the annular portion 11 should be disposed at a distance comprised between 1.5 mm and 3 mm from the optical axis 70 of the eye, such that the annular portion 11 is located within the 30° of the visual field of the eye (see FIG. 2).

Figure 4:
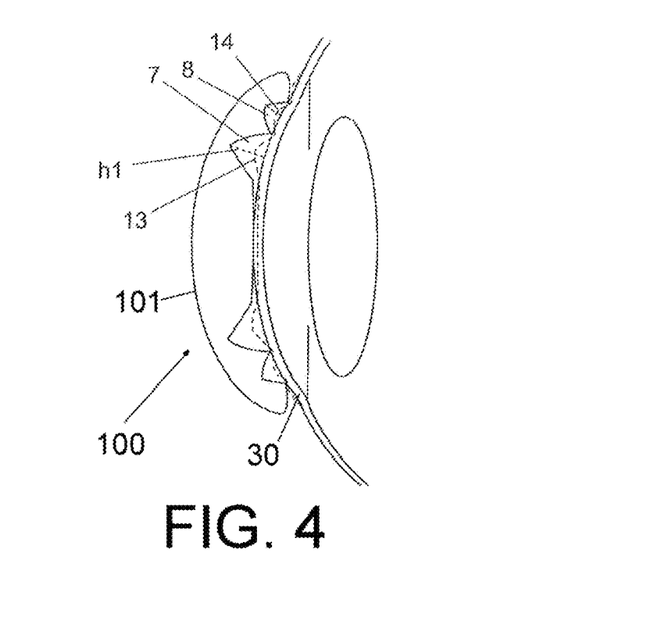
FIG. 4 is a cross-sectional view of the lens of FIG. 2 disposed over the surface of the cornea of a human eye.

Given the fact that the radius of curvature of the cornea 30 is different for each patient, the segments 2, 3 of the annular portion 11 fit such that the deformation of the surface of the cornea 30 caused by the first annular portion 11 occurs in the desired amount, between 4 and 8 diopters, and in a location within the 30° with respect to the optical axis 70 (see FIG. 4).

This allows the first power amp-up ring 13 to be positioned in the mid-peripheral area and not in the pupillary area, which would induce the creation of a double image in the fovea, with the deficiency that follows from the central vision of the patient.

Furthermore, the supplemental teardrops accumulation area 8 defined by the supplemental annular portion 12 will have a teardrops height h2, smaller than the height h1 of the first teardrops accumulation area 7, which induces the creation of the second power amp-up ring 14 on the surface of the cornea 30, which will have a power amp-up lower than that of the first ring 13. In this manner, the movement of the lens 100 and its displacement on the surface of the cornea 30 decrease with the supplemental annular portion, thereby promoting the proper centering of the latter, besides contributing to the advance of the images on the peripheral retina in eyes having pupil diameters larger than the standard diameter or in low light conditions (see FIG. 4). The supplemental teardrops accumulation area 8 has a teardrops height h2 comprised between 10 and 30 microns, said height h2 being smaller than h1.

In order to obtain the effect of creating the first and second power amp-up ring 13, 14, the supplemental teardrops accumulation area 8 induced by the annular portion 12 will, in one form, be disposed at a radial distance comprised between 2.5 mm and 5 mm from the optical axis 70 of the eye (see FIG. 2).

Alternatively, the contact lens 100 of the present disclosure may comprise supplemental annular portions disposed between the annular portion 12 and the segment 6 forming the lacrimal meniscus 17.

Figure 1:
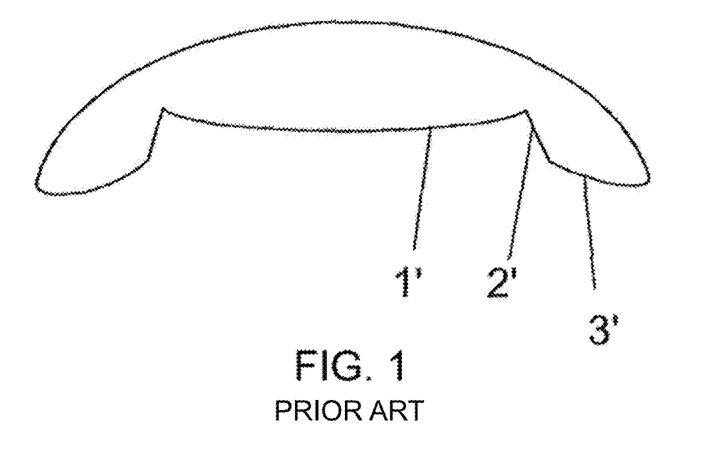
FIG. 1 is a cross-sectional view of an orthokeratology contact lens according to the prior art.

The contact lens 100 observed in FIG. 1 refers to an orthokeratology contact lens of the prior art in which the use of one single central segment 1', a segment 2' and a final segment 3' which form the edge lacrimal meniscus may be observed.

Figure 6:
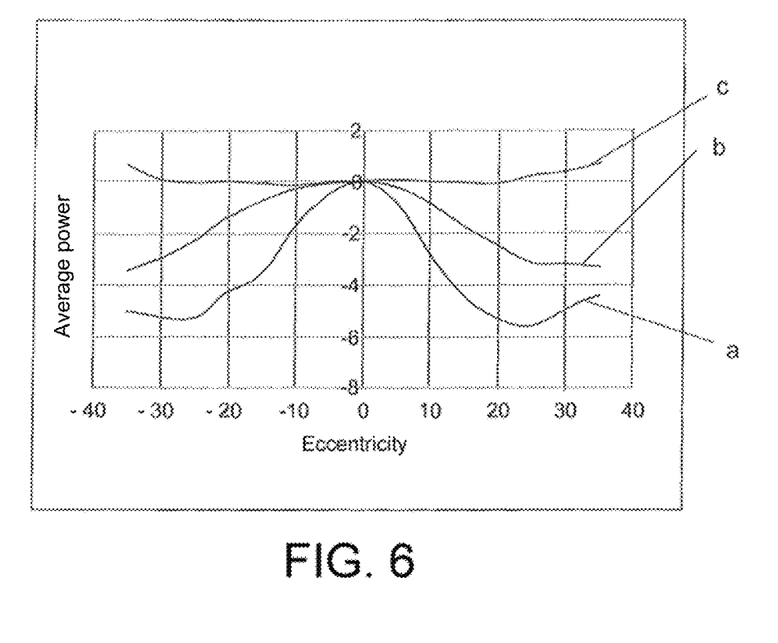
FIG. 6 is a graph illustrating the curves of corneal power amp-up with respect to the optical axis determined for: a) the contact lens of the present disclosure, b) a lens of the prior art, and c) the corneal power base line.

FIG. 6 corresponds to a graph showing the corneal power curves determined relatively for: a) the contact lens of the present disclosure, b) the lens of the prior art, and c) the base line of the corneal power or of the eye after treatment.

The contact lens of the analyzed prior art corresponds to a reverse-geometry orthokeratology contact lens that has neither the combination of the first and second segments 2, 3 nor a supplemental annular portion 12. These types of lenses are the conventional lenses used in the prior art to slow the progression of the myopia and which are disclosed in U.S. Pat. No. 7,025,460.

FIG. 6 shows the average power values at one point with respect to the optical center or axis 70. The curve C represents the average relative power values determined for an eye before receiving a treatment to slow the progression of the myopia, the curve B represents the average relative power values of an eye after using a conventional lens of the prior art for a ten-night period, and the curve A represents the average relative power values of an eye after using the lens of the present disclosure for a ten-night period.

As shown in FIG. 6, the corneal power curve shows that, in the case of the present disclosure, in the curve a), there is obtained a value of the corneal power change over the entire visual field from 35° nasal to 35° temporal, reaching an increased peak comprised between 4 and 6 diopters at 25° higher than that obtained when using a conventional lens, which is induced by the use of the annular portion 11 in the contact lens 100 of the present disclosure, which allows, on the one hand, having a proper correction in the central area 10 and, on the other hand, inducing the formation of the first power amp-up ring 13 positioned in the mid-peripheral area and not in the pupillary area, showing that the lens 100 of the present disclosure induces a more significant controlled power change over a larger surface.

In the case of the conventional lens, the use of one single segment 1' modifies the central vision over a wide surface of 6 mm, inducing a power amp-up corneal modification away from the axis and compare to the amount of correct myopia, which significantly reduces the effectiveness of the control of the myopia, in particular small myopia, and also the average power amp-up values in the vision field from 30° nasal to 30° temporal, lower than 4 diopters, are not enough to achieve a proper advance of the peripheral image and, therefore, an effective treatment of the myopia control.

Figure 7:
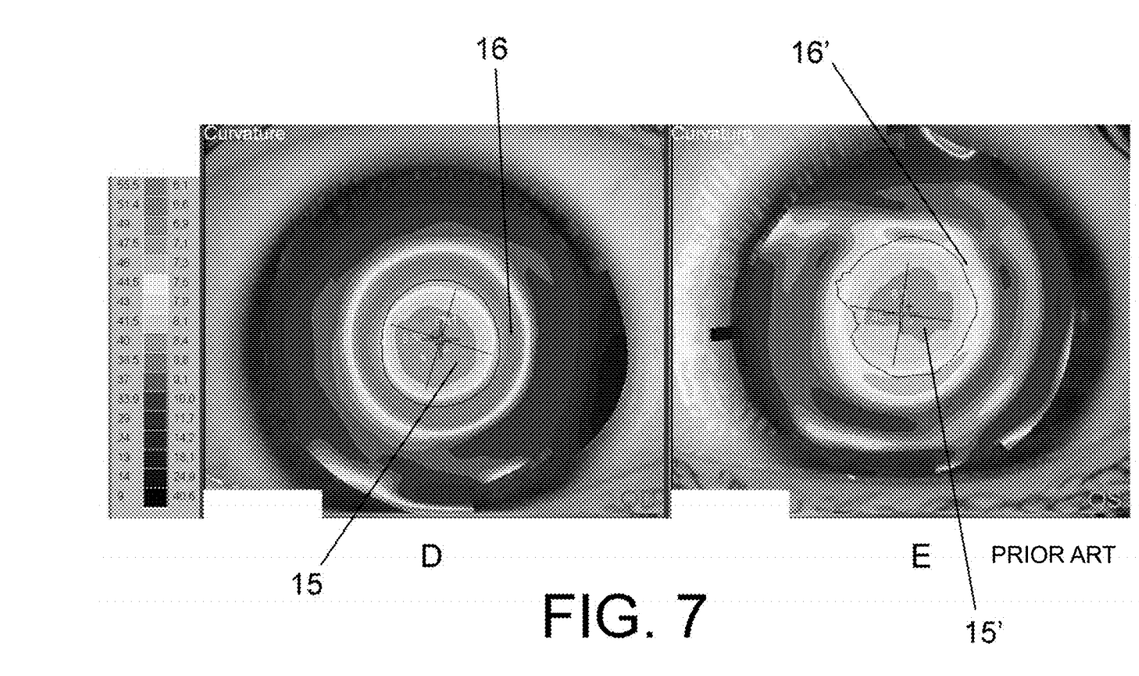
FIG. 7 shows the topographic maps determined for: D) a contact lens of the present disclosure, and E) a contact lens of the prior art.

FIG. 7 shows the topographic maps of a patient created after using the contact lens 100 of the present disclosure (model D) and after using the conventional contact lens previously defined in the prior art (model E). Said topographic maps are created using a corneal topographer (Keraton, Optikon 2000, Rome) widely used in the prior art. In both models, there may be observed a central area 15, 15' which corresponds to the correction of the vision in the optical axis 70 or of the central vision (centered around the cross) and a power amp-up ring 16, 16' disposed around and outside of the pupil (represented by the thin, irregular, rounded line).

As shown in FIG. 7, in the conventional lens, no complete, evenly defined ring is obtained, whereas in the lens 100 of the present disclosure, this annular power amp-up area is clearly defined and visible, which indicates that in this annular area, a similar amp-up of the power is obtained everywhere, proving that by using the lens 100 of the present disclosure, the desired conformation in the specific area of the cornea 30 is achieved in an accurate and controlled manner, thus enabling an effective control of the myopia.

Figure 8:
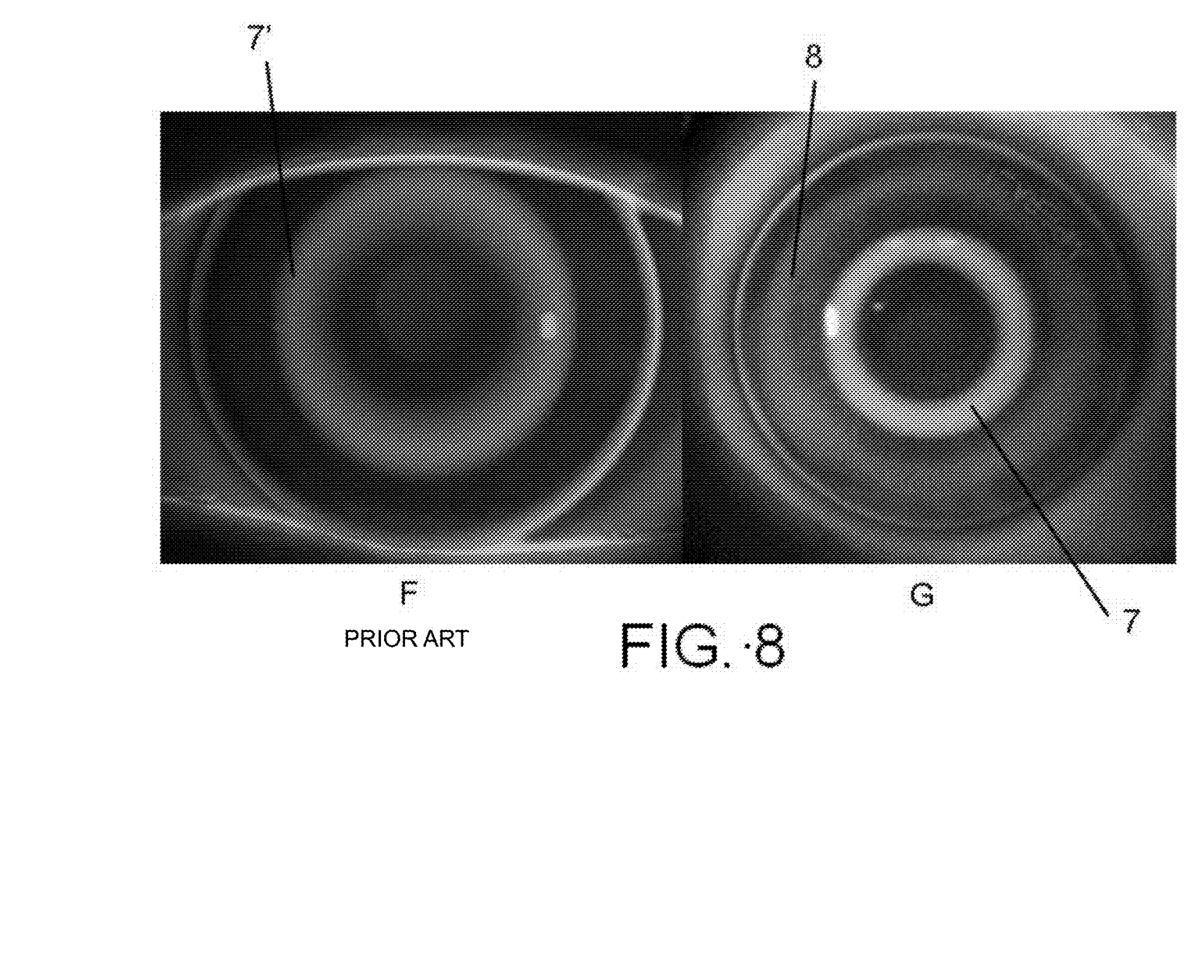
FIG. 8 illustrates images obtained after adding a sodium-fluorescein solution to the eye of a patient in the presence of a contact lens, where in image G the eye is represented using the contact lens of the present disclosure and in image F the eye is represented with the contact lens of the prior art.
Figure 9:
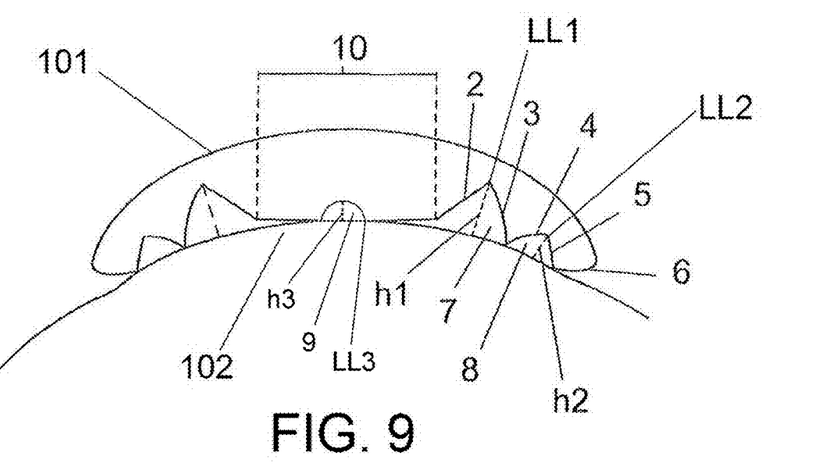
FIG. 9 is a cross-sectional view of the orthokeratology contact lens according to another form of the present disclosure.
Figure 10:
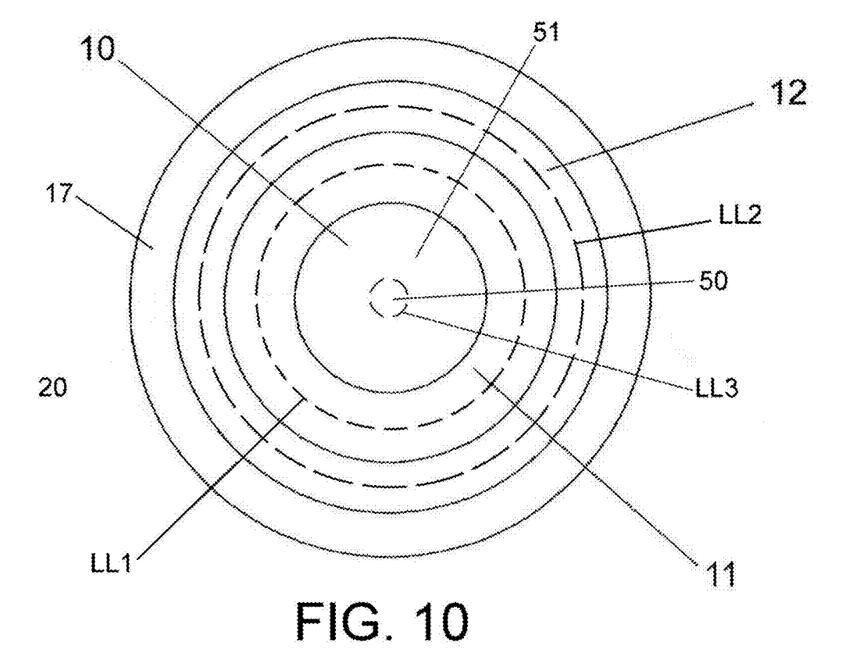
FIG. 10 is a top view of the orthokeratology contact lens of FIG. 9.
Figure 11:
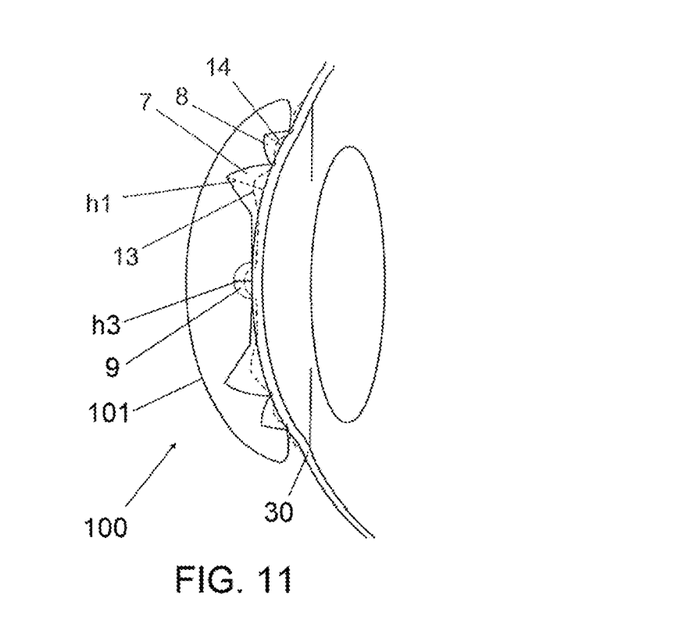
FIG. 11 is a cross-sectional view of the lens of FIG. 9 disposed on the cornea of a human eye.
Figure 12:
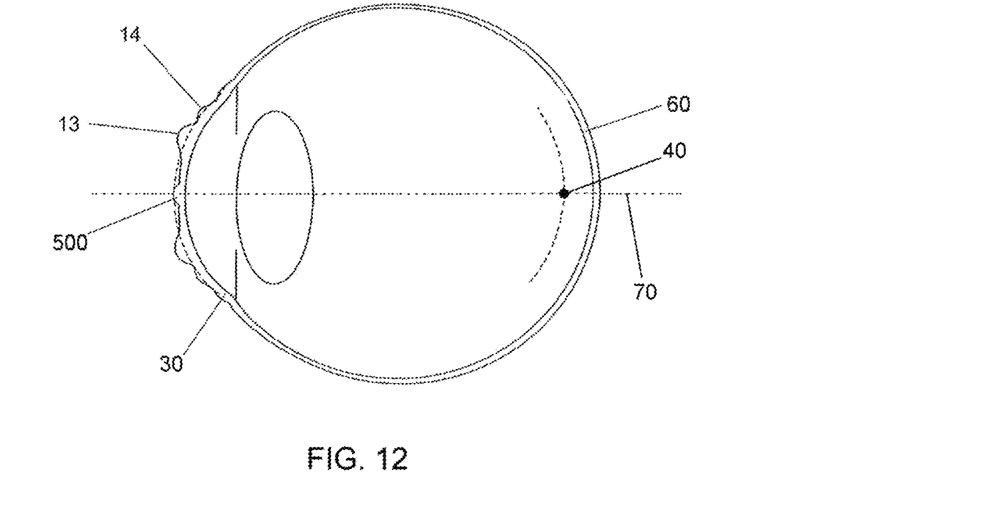
FIG. 12 is a cross-sectional view of a human eye treated with the lens of FIG. 9, illustrating the conformation of the surface of the cornea caused by the lens and the point where the peripheral image is projected.

FIG. 8 shows the images obtained after adding a sodium-fluorescein solution to the eye of the patient in the presence of a contact lens. The image G shows the eye using the contact lens 100 of the present disclosure and the image F shows the eye with the contact lens of the prior art or a conventional lens disposed thereon. The lighter areas of the images represent areas having a more significant teardrops accumulation 7, 7', 8.

In accordance with the images of FIG. 8, it is easy to observe the obvious differences that the two annular teardrops accumulation areas 7, 7', 8 represent for each represented lens. In the case of the conventional lens (image F), there is shown a larger and unique teardrops accumulation area 7', while in the case of the contact lens 100 of the present disclosure (image G), two teardrops accumulation areas may be clearly observed, the first teardrops accumulation area 7 and the second supplemental teardrops accumulation area 8, where the light color represents the areas having a more significant fluorescence or a more significant teardrops accumulation or volume. The inner area is closer to the center and corresponds to the teardrops accumulation area 7 having a very high definition, because of a larger controlled teardrops height h1, which will modify the surface of the cornea 30 in a controlled manner because of the induced hydrodynamic forces generating the optical surfaced responsible for the slow-down or the inhibition of the progression of the myopia.

According to an alternative form and as shown in FIGS. 9 to 13, the contact lens 100 may comprise an inner circular portion 50 and an outer annular portion 51, both disposed concentrically with one another and separated by an inner annular border line LL3 (see FIG. 10) in the central area 10. The inner circular portion 50 is defined by a curve with a radius of curvature smaller on the incurved anterior side of the lens (see FIG. 9) where the inner annular border line LL3 is in contact with the corneal epithelium 30, such that the inner circular portion 50 defines an inner teardrops accumulation area 9 which exerts a negative hydrodynamic pressure on the corneal epithelium, conforming the surface of the cornea 30 and creating a power amp-up hemisphere 500 which defines a ridge for said inner teardrops accumulation 9 having a teardrops height h3 (see FIGS. 11 and 12). Said power amp-up hemisphere 500 causes a power change such as to create a refraction of the images and obtain an advance of these with respect to the retina. The teardrops height h3 has a value within a range from 5 to 50 microns.

Figure 13:
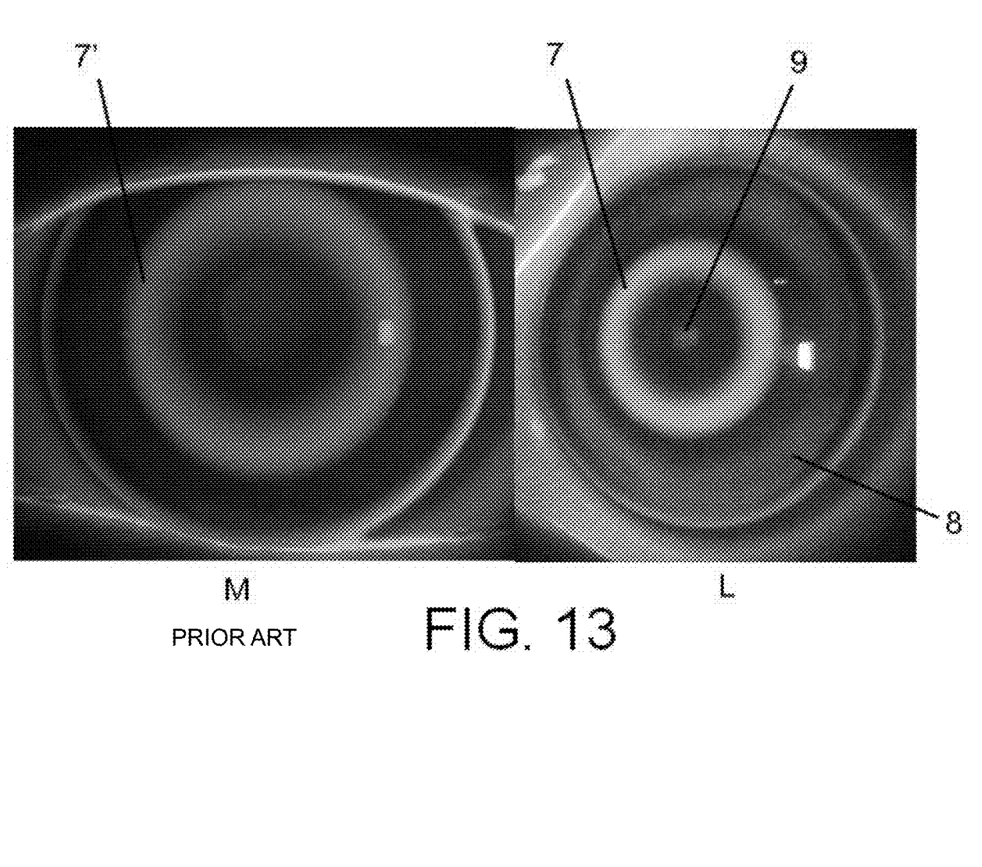
FIG. 13 illustrates images obtained after adding a sodium-fluorescein solution to the eye of a patient in the presence of a contact lens, where in image M the eye is represented using the contact lens of FIG. 2 and in image L the eye is represented with the contact lens of the prior art.

FIG. 13 shows the images obtained after adding a sodium-fluorescein solution to the eye of the patient in the presence of a contact lens. In the case of the image L, the eye using the contact lens 100 is represented for an alternative form of the present disclosure and, in the case of the image M, the eye is represented with the contact lens of the prior art or the conventional lens disposed thereon. The lighter areas in the images represent areas having a more significant teardrops accumulation 7, 7', 8, 9.

In accordance with the images of FIG. 8, the obvious differences represented by the three annular teardrops accumulation areas 7, 7', 8, 9 for each represented lens can be observed. In the case of the conventional lens (image L), there is shown a unique larger teardrops accumulation area 7', while in the case of the contact lens 100 of the present disclosure, for an alternative form (image M), three teardrops accumulation areas may be clearly observed: the first teardrops accumulation area 7, the second supplemental teardrops accumulation area 8 and an inner teardrops accumulation area 9, where the light color represents the areas having a more significant fluorescence or a more significant teardrops accumulation or volume.

Despite the fact that reference has been made to only one specific form of the present disclosure, it is obvious to those skilled in that art that the described lens is prone for several variations and modifications, and that all of the aforementioned details may be replaced with other technically-equivalent ones, yet without reducing the scope of protection defined by the appended claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An orthokeratology contact lens for controlling myopia comprising:
   an incurved anterior side; and
   a posterior side comprising a curvature, the posterior side configured to be applied to an eye comprising a retina and a cornea with a corneal epithelium, wherein the posterior side defines:
   a central area adapted to coincide with an optical or visual area of the eye and conform a surface of the cornea by exerting a positive hydrodynamic pressure on the corneal epithelium; and
   a peripheral area concentric with the central area, the peripheral area comprising an annular portion defining a teardrops accumulation area configured to exert a negative hydrodynamic pressure on the surface of the cornea by conforming the surface of the cornea and creating a positive power amp-up ring, wherein the annular portion includes:
      a first segment which extends concentrically with respect to the central area, along a radius defined with respect to a geometric center which defines the curvature of the posterior side, towards the incurved anterior side up to an annular border line; and
      a second segment which extends from the annular border line and concentrically with respect to the central area, the second segment configured to extend up to a point of contact with the surface of the cornea,
   wherein the first segment and the second segment form a broken line such that the annular border line defines a ridge for the teardrops accumulation area having a teardrops height.

2. The contact lens according to claim 1, wherein an apex of the ridge formed by the first and second segments is a singular point.

3. The contact lens according to claim 1, wherein the teardrops height is between 30 and 150 microns.

4. The contact lens according to claim 1, wherein the broken line is formed by the first segment, the second segment and the central area.

5. The contact lens according to claim 4, wherein the central area and the first segment have an intersection formed by a singular point.

6. The contact lens according to claim 1, wherein the annular border line is located at a radial distance between 1.5 mm and 3.5 mm from the geometric center of the central area.

7. The contact lens according to claim 1, wherein the annular portion is configured to induce the positive power amp-up in a region between 10° and 30°, creating a refraction of a peripheral image in a region in front of the retina of the eye.

8. The contact lens according to claim 1, wherein the central area is flat.

9. The contact lens according to claim 1, wherein the central area is incurved.

10. The contact lens according to claim 1, wherein the peripheral area further comprises:
   a supplemental annular portion defining a supplemental teardrops accumulation area configured to exert a negative hydrodynamic pressure on the surface of the cornea by conforming the surface of the cornea and creating a supplemental positive power amp-up ring, wherein the supplemental annular portion includes:
      a first segment which extends concentrically with respect to the central area, along the radius defined with respect to the geometric center which defines the curvature of the posterior side, towards the incurved anterior side up to a supplemental annular border line; and
      a second segment which extends from the supplemental annular border line and concentrically with respect to the central area, the second segment configured to extend up to a point of contact with the surface of the cornea, wherein the first segment and the second segment form a broken line such that the supplemental annular border line defines a ridge for the supplemental teardrops accumulation area having a teardrops height.

11. The contact lens according to claim 10, wherein the teardrops height of the supplemental teardrops accumulation area is smaller than the teardrops height of the teardrops accumulation area of the annular portion.

12. The contact lens according to claim 10, wherein the supplemental annular border line is located at a radial distance between 2.5 mm and 5 mm with respect to the geometric center of the central area.

13. The contact lens according to claim 10, wherein the peripheral area comprises a segment adjacent to the supplemental annular portion which extends towards the incurved anterior side up to an annular edge for connection with the latter, forming an edge lacrimal meniscus which enables teardrops exchange beneath the contact lens when winking.

14. The contact lens according to claim 13 further comprising a plurality of supplemental annular portions disposed between the supplemental annular portion and the segment that forms the lacrimal meniscus.

15. The contact lens according to claim 1, wherein the central area comprises an inner circular portion and an outer annular portion, the inner circular portion and the outer annular portion disposed concentrically with one another and separated by an inner annular border line, wherein the inner circular portion is defined by a curve with a radius of curvature smaller than the incurved anterior side of the contact lens, wherein the inner annular border line being in contact with the corneal epithelium such that the inner circular portion defines an inner teardrops accumulation area which exerts a negative hydrodynamic pressure on the corneal epithelium, conforming the surface of the cornea and creating a power amp-up hemisphere which defines a ridge for the inner teardrops accumulation area having a teardrops height.

* * * * *